US008819856B1

(12) United States Patent
Tiffe et al.

(10) Patent No.: US 8,819,856 B1
(45) Date of Patent: Aug. 26, 2014

(54) DETECTING AND PREVENTING NONCOMPLIANT USE OF SOURCE CODE

(75) Inventors: Sven Tiffe, Munich (DE); Michael Conradt, Munich (DE); Jay Brown, Hayward (CA)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 13/567,483

(22) Filed: Aug. 6, 2012

(51) Int. Cl.
*G06F 7/04* (2006.01)
*G06F 21/12* (2013.01)
*G06F 21/56* (2013.01)

(52) U.S. Cl.
CPC ............ *G06F 21/125* (2013.01); *G06F 21/563* (2013.01)
USPC .......................................................... 726/31

(58) Field of Classification Search
CPC ................................. G06F 21/25; G06F 21/563
USPC .......................................................... 726/31
See application file for complete search history.

(56) References Cited

U.S. PATENT DOCUMENTS

| 6,397,236 | B1* | 5/2002 | Garg et al. .................... 708/446 |
| 2005/0138111 | A1* | 6/2005 | Aton et al. .................... 709/201 |
| 2006/0053164 | A1* | 3/2006 | Ewing et al. ............... 707/104.1 |
| 2006/0212438 | A1* | 9/2006 | Ng .................................... 707/4 |
| 2008/0082687 | A1* | 4/2008 | Cradick et al. ................ 709/246 |
| 2011/0246968 | A1* | 10/2011 | Zhang et al. .................. 717/125 |
| 2013/0152050 | A1* | 6/2013 | Chang et al. .................. 717/125 |

OTHER PUBLICATIONS

Hummel, et al, "Index-Based Code Clone Detection: Incremental, Distributed, Scalable", 2010 IEEE International Conference on Software Maintenance (ICSM), Sep. 12-18, 2010, 9 pages.
Baxter, et al, "Clone Detection Using Abstract Syntax Trees", In Proceedings of the ICSM '98, Nov. 16-19, 1998, 11 pages.
Koschke, et al, "Clone Detection Using Abstract Syntax Suffix Trees". In Proceedings of the 13th Working Conference on Reverse Engineering (WCRE) '06, 2006, 10 pages.

* cited by examiner

*Primary Examiner* — Mohammad W Reza
(74) *Attorney, Agent, or Firm* — Brake Hughes Bellermann LLP

(57) ABSTRACT

A system is disclosed for identifying and preventing noncompliant uses of any portion of source code or other protected content. The system includes at least one processor and a memory storing instructions that cause the system to scan files located at a source location for excerpts of protected source code. The instructions may cause the system to create a temporary clone detection structure for the files at the source location. The instructions may cause the system to use the temporary clone structure and a pre-calculated clone structure for source code files in a protected code location, to identify code clones, and to generate data used to alert a user that the source location includes portions of source code from the protected code location. When clones are found, the instructions may optionally cause the system to prevent the copying of the files containing the code clones.

26 Claims, 5 Drawing Sheets

DETECTING AND PREVENTING NONCOMPLIANT USE OF SOURCE CODE

TECHNICAL FIELD

This description relates to detection of code clones and, more specifically, to systems and methods for identifying and flagging non-compliant use of source code.

BACKGROUND

Software applications are often made up of many individual files written by various software developers, with each file containing software code that performs certain functions. As a software project grows in scope, the number and size of the individual files grows, as does the number of software developers working on the project. Many organizations that create software desire to organize the various files, keep track of versions, control access to the files to protect the software from being accidently modified, and to protect the software from being copied or distributed. Accordingly, organizations often use a code storage system to store software code. Such a code storage system often provides version control and is sometimes referred to as a code repository. The code storage system may be a designated directory on a computing system, or the storage system may include software, for example, a version control system, that keeps track of the various versions of software, the identity of a person who has modified each the file, the identity of a person who has checked a file out of the repository, etc. Often, a storage system with version control allows an organization to track versions of the code files and requires authorization to access or update the files. In conjunction with the code storage system, an organization may create policies that define non-compliant use or copying of the source code, such as policies that prevent source code or any part of source code, from being copied to laptop computers, from being attached to emails, from being copied to directories visible outside the organization over a network, such as over the Internet, or to any other unsecure location. Organizations may designate the files in the code storage system, or part of the code storage system, as protected and the non-compliant use policies may apply to any portion of the source code files stored in the protected locations.

Source code stored in a central location may be searched for copies of code snippets. A code snippet is a portion of code, for example a few lines of source code, that often performs some function. Software developers may desire to locate certain code snippets to determine what source code files contain the snippet, to use the code snippet as a template or to make changes to each occurrence of the snippet in the code base. To facilitate the search process, a code search engine that works with the storage system may include a pre-calculated clone detection structure, such as an index, that can be used to detect code clones between files in the code base. A code clone may be a code snippet that appears in more than one file. Thus, a source code file may share one or more code clones with other source code files.

While such a pre-calculated clone detection structure may be beneficial for detecting code clones within a code storage system, some organizations may desire to determine whether code clones exist between a file not included in the code storage system and the files in the code storage system, or between files located in a location designated secure or secret and a location designated less protected or even public. As discussed above, some organizations may desire to protect source code stored in a protected location within the code storage system by limiting the places that the code or portions of the code exist. In some instances, such as with a version control system, the entire code storage system may be considered a protected code location. In other instances only certain directories or locations may be considered protected locations.

Organizational policies may prohibit snippets of source code, whether a few lines or an entire file, from being copied to or existing in unsecure or unauthorized locations, such as a mobile device (e.g., laptops, tablets, smartphones, USB drives, etc.), an email attachment, a server or directory visible to the public via the Internet, or a data center located in a particular country or region. While, text-based comparison of the source code files can detect exact copies of code snippets, text-based comparisons cannot detect snippets that retain the same functionality but have been refactored or modified. Therefore, a challenge remains to identify clones between source code in a protected code location and files located in some other location, such as on a mobile device, attached to an e-mail, or in some other unsecure or unauthorized location.

SUMMARY

One aspect of the disclosure can be embodied in a method that includes receiving, by one or more processors, a request to copy portions of one or more source code files from a source location to a destination location, and identifying a number of code clones between the one or more source code files and source code from a protected code location. The method may also include determining whether the number of identified code clones meets a threshold and determining whether the destination location is authorized to contain source code from the protected code location. When it is determined that the number of identified clones meets the threshold and that the destination location is not authorized to contain source code from the protected code location, the method may also include preventing one or more portions of the source code files from being copied from the source location to the destination location.

These and other aspects can include one or more of the following features. For example, the destination location may be associated with a portable, removable, storage device or the source location may be associated with a first data center and the destination location may be associated with a second data center. When the destination location is a second data center, determining whether the destination location is authorized may be based on a geographical location of the second data center.

Another aspect of the disclosure can be a system for detecting non-compliant source code that includes one or more processors and a memory storing instructions that, when executed by the one or more processors, cause the one or more processors to perform operations. The operations include receiving a location of one or more source code files and creating, in response to the receiving, a temporary clone detection structure for each of the one or more source code files. The operations also include identifying a number of code clones using the temporary clone detection structure and a pre-calculated clone detection structure for source code files stored in a protected code location. The operations may include determining whether the number of identified code clones meets a threshold and, when it is determined that the number of identified code clones meets the threshold, generating data used to alert a user that the location contains code clones. In some implementations, the threshold is based on a length of at least one of the code clones.

In some implementations, determining whether the number of identified clones meets the threshold may include for a specific source code file, determining whether a number of code clones for the specific file meets the threshold. In such implementations, the operations may also include preventing the specific source code file from being copied when it is determined that the number of code clones for the specific file meets the threshold. In some implementations, determining whether the number of identified code clones meets the threshold may include, for each of the one or more source code files, determining a number of code clones for each file, calculating an average number of code clones per file, and determining whether the average number of code clones meets the threshold.

Another aspect of the disclosure can be a tangible computer-readable storage device having recorded and embodied thereon instructions that, when executed by one or more processors of a computer system, cause the computer system to receive a location of one more source code files, create, in response to the receiving, a temporary index of tokenized statements for each of the one or more source code files, and to identify a number of code clones in the source code files using the temporary index and a pre-calculated index of tokenized statements from source code files stored in a protected code location. The instructions may also cause the computer system to determine whether the number of identified code clones meets a threshold; and generate data used to alert a user that the location contains code clones when it is determined that the number of identified code clones meets the threshold. In some implementations, the instructions may also cause the computer system to prevent at least one source code file from being added to the protected code location when it is determined that the number of identified code clones meets the threshold.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
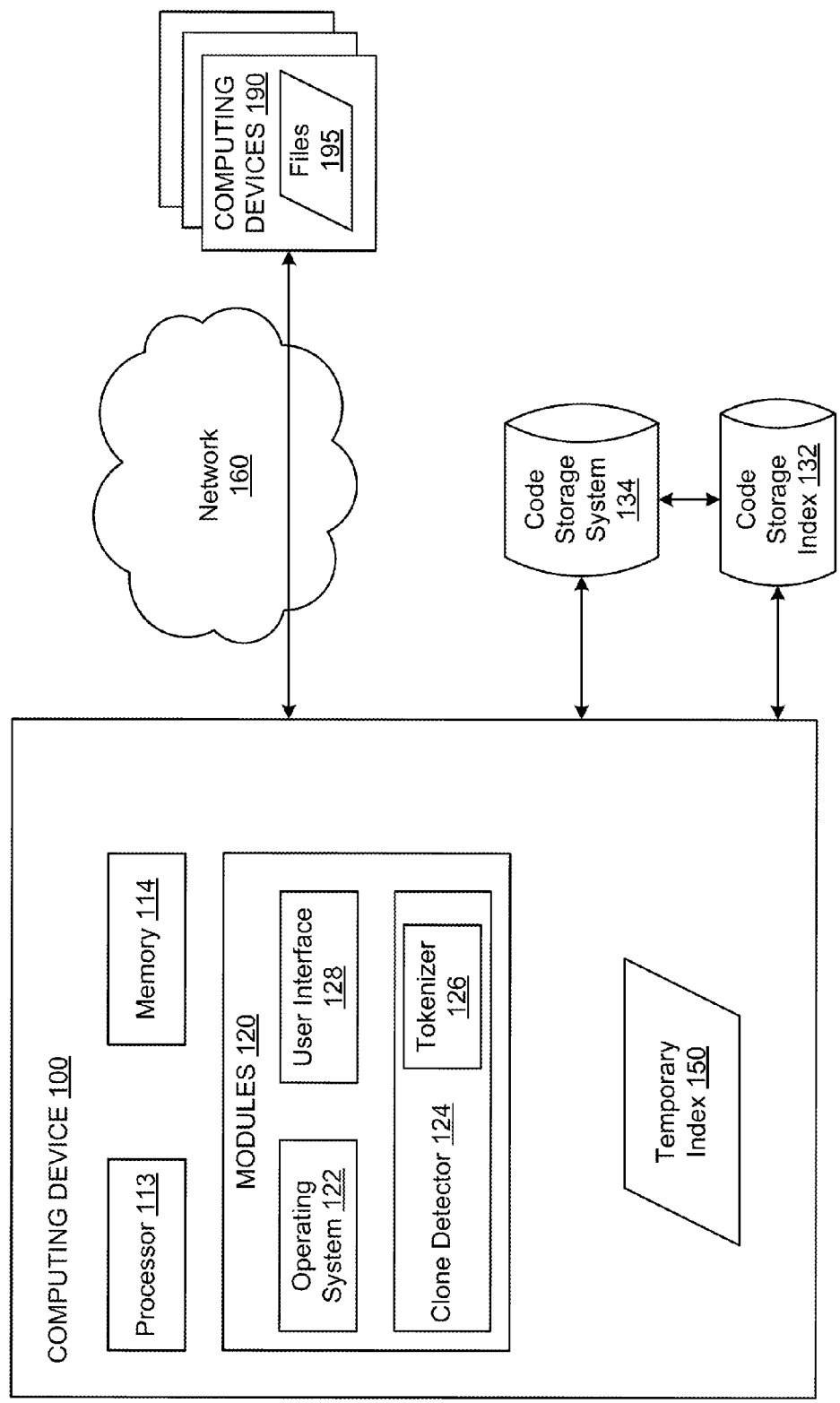
FIG. 1 illustrates an example system in accordance with the disclosed subject matter.

Disclosed implementations provide clone detection systems and methods for preventing any portion of source code from a protected code location, whether a few lines or an entire file, from being copied to unauthorized locations and for reporting non-compliant instances of source code snippets. In some implementations, the system may initiate a clone-detection program when a user requests that any portion of a source code file be copied from a source location, such as a home directory or another directory where source code is stored and considered protected, to a destination location. In some implementations, the clone-detection program may determine whether any code clones exist between the files in the source location and the files in protected code locations.

As discussed above, a code clone is a number of statements in one source code file that correspond to, or are functionally similar to, statements in another source code file. Because source code uses variable names, comments, and function names that easily change between source code files while still retaining the same functionality, a text-based comparison of the source code files cannot detect code clones with accuracy. Thus, code clone detection is often based on a normalization or tokenization of the source code.

Normalizing source code statements removes variable and function names and comments from the code and replaces the variables and functions with tokens so that such differences do not hinder the identification of clones. For example, the statement "if (node !=null)/*none found*/" becomes normalized to "if (var0 !=null)" where 'node' is a variable name replaced with the token 'var0' and '/*none found*/' is a comment that is removed. In one embodiment, an index may be created that contains an entry for a hash of n normalized consecutive statements, for example 5 or 8 consecutive statements, from the file, along with the file name and the position in the file of the first statement in the hash. The pre-calculated index can be used to find code clones by matching the hash values of each entry in the index against other entries in the index. Such an index is described in "Index-Based Code Clone Detection: Incremental, Distributed, Scalable" by Hummel et al., available for download at http://www4.in.tum.de/~juergens/publications/icsm2010_crc.pdf, which is incorporated herein by reference. The index of the Hummel publication is presented as one example of an index of token-based statements that can be used to locate code clones within the files of a code base. Disclosed implementations may include other clone detection structure formats. Furthermore, normalization and tokenization represent only one example of clone detection methods and the disclosed implementations may operate using any method of clone detection, such as the syntax tree methods described in "Clone Detection Using Abstract Syntax Trees" by Baxter et al., available for download at http://www.semdesigns.com/Company/Publications/ICSM98.pdf, and "Clone Detection Using Abstract Syntax Suffix Trees," by Koschke et al., available for download at http://www.tzi.de/st/papers/astclones-wcre06.pdf.

Once code clones are found, disclosed implementations include various methods of determining whether the source code files may be subject to non-compliant uses. For example, in one implementation, the system may compare the clones found to a threshold to determine whether sufficient clones exist to invoke the non-compliant reporting procedures. In some implementations, the system may prevent individual files from being copied or may prevent any files from being copied from a source location to a destination if a sufficient number of clones exist. In some implementations, the system may only prevent copying when the destination has a restricted classification. For example, a destination may be restricted based on geographic location, media type, known uses for the destination, etc.

In some implementations, systems and methods may scan a specified location to determine whether code clones exist where policy indicates they should not exist. For example, systems may initiate the clone-detection program when a portable device, such as a laptop, a tablet, a universal serial bus (USB) drive, etc., connects or authenticates to a network with access to the code base. Upon connection or authentication, the system may automatically scan the portable device to determine whether the device stores any files that share a clone with the code base. If a clone is found, the system may report the clone to an administrator or some other manager for further investigation. As previously indicated, the reporting may be based on a threshold of clones, either for an individual file or a directory.

FIG. 1 is a block diagram of a computing device 100 in accordance with an example implementation. The computing device 100 may be used to implement the non-compliant source code detection techniques described herein. The depiction of computing device 100 in FIG. 1 is described as a code clone detection system for a code base repository. Source code may include files of any type that contain statements intended to be interpreted by a processor of a computing device, whether directly or through compilation or interpretation. But, it will be appreciated that the clone detection techniques described may be used in other configurations where the need to identify clones arises, or where copies of other types of protected content are not easily detected using text-based comparison. Accordingly, code clones, as used herein, may refer generically to any number of statements from one file, whether source code or other content, that have equivalent statements in another file.

Figure 5:
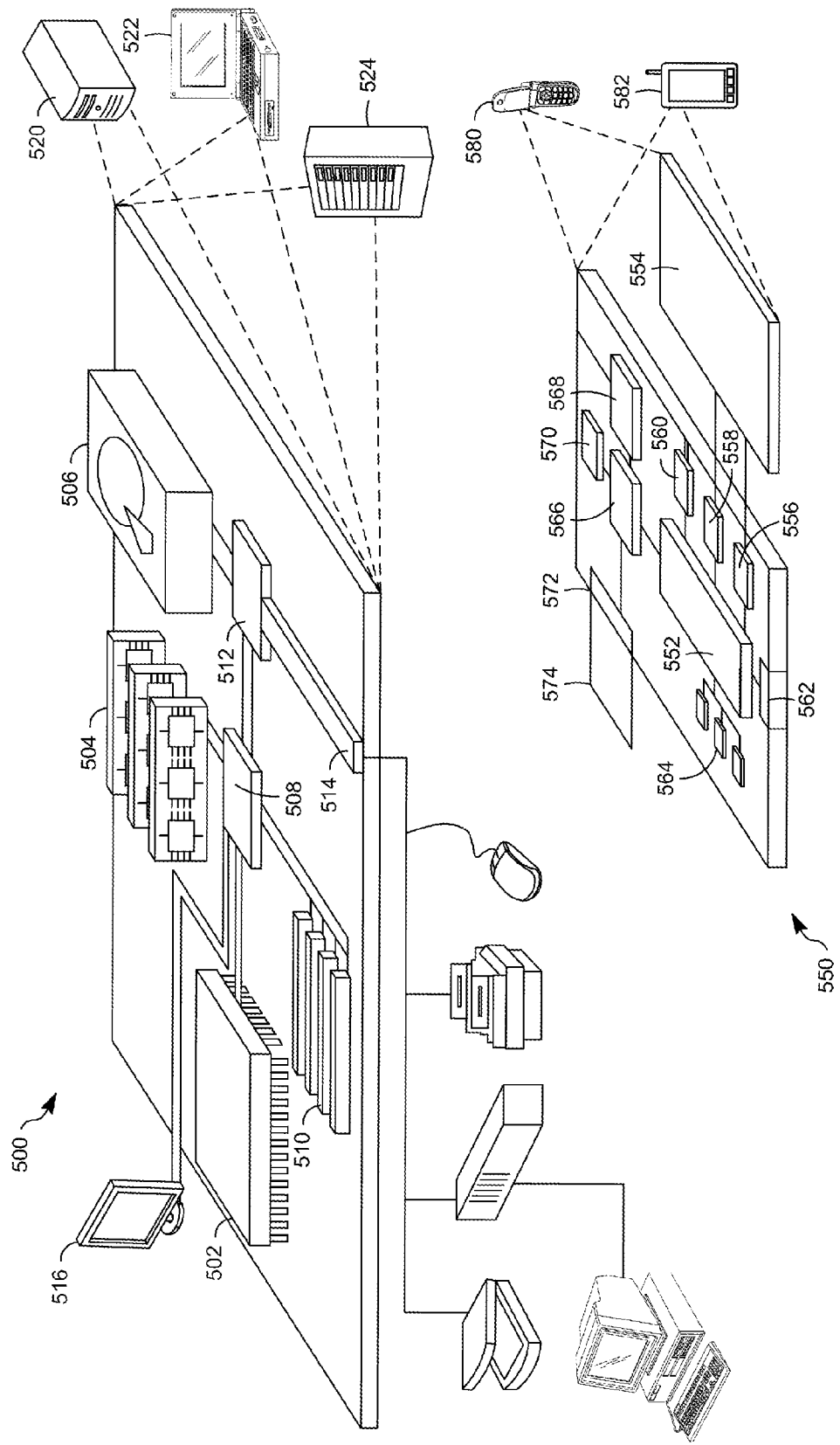
FIG. 5 shows an example of a computer device that can be used to implement the described techniques.

The computing device 100 may be a computing device that takes the form of a number of different devices, for example, a standard server, a group of such servers, or a rack server system. In some implementations, computing device 100 may be implemented in a personal computer, or a laptop computer. The computing device 100 may be an example of computer device 500, as depicted in FIG. 5.

Computing device 100 can include one or more processors 113 configured to execute one or more machine executable instructions or pieces of software, firmware, or a combination thereof. The computing device 100 can include an operating system 122 and one or more computer memories 114, for example a main memory, configured to store data, either temporarily, permanently, semi-permanently, or a combination thereof. The memory 114 may include any type of storage device that stores information in a format that can be read and/or executed by processor 113. Memory 114 may include volatile memory, non-volatile memory, or a combination thereof. In some implementations memory 114 may store modules, for example modules 120. In some implementations modules 120 may be stored in an external storage device (not shown) and loaded into memory 114. The modules 120, when executed by processor 113, may cause processor 113 to perform certain operations.

For example, in addition to operating system 122, modules 120 may also include a clone detector 124 that enables computing device 100 to identify code clones between files in a protected code location and one or more files not included in the protected code location. For example, computing devices 190 may store files 195 that the clone detector 124 can search for code clones. Computing devices 190 may be any type of computing device in communication with computing device 100, for example, over network 160. Computing devices 190 may include desktops, laptops, tablet computers, mobile phones, smart phones, etc. In some embodiments, computing device 190 may be part of computing device 100 rather than a separate computing device. For example, files 195 may be located in a home directory for a user of computing device 100. User interface module 128 may provide a user interface to the user of computing device 190 that allows the user to access the computing device 100. Files 195 may be stored in any location on any of the various computing devices, including on a removable storage device such as a USB memory stick, a Flash memory card, a CD or DVD disk, etc. Clone detector 124 may use a tokenizer 126 to process files 195, create tokenized statements from the files, and create temporary index 150 from the tokenized statements. In some embodiments, clone detector 124 may use other methods of clone detection and index 150 may be another type of clone detection structure. Once clone detector 124 creates temporary index 150, clone detector 124 may use the index 150 and a pre-calculated code storage index 132 to identify code clones in the files 195.

Pre-calculated code storage index 132 may be a clone detection structure used to search the code storage system 134 for clones and may be created and updated as code is added to the code storage system 134. In some embodiments code storage index 132 may be created at set intervals of time, such as daily, twice a day, etc. In some implementations, code storage index 132 may be updated as changes are made to the files in the code storage system 134. Because code storage index 132 exists and is maintained independently of the non-compliant code detection process, code storage index 132 may be considered pre-calculated for the purposes of clone detector 124. However, in some embodiments, code storage index 132 could be created at the invocation of clone detector 124 and still be considered a pre-calculated index. Code storage index 132 may be used, for example, to search for code clones between files housed in protected locations within code storage system 134 and those not located in the protected locations. For example, in some implementations files stored in a ./SECURE/. directory may be considered protected, while files stored in a ./PUBLIC/. directory may be considered unprotected. In some implementations any files stored in a version control system may be considered protected.

In contrast, clone detector 124 may create temporary index 150 each time clone detector 124 is invoked. In some implementations, temporary index 150 may have the same format as index 132. For example, temporary index 150 may represent tokenized or tokenized and hashed statements from code files 195. As discussed in more detail below, the files 195 may be identified to clone detector 124 when clone detector 124 is invoked. For example, in some implementations, a user of computing device 190 may supply the identity of files 195 through user interface module 128. In other implementations, clone detector 124 may determine files 195 based on other parameters provided to clone detector 124, such as the location of a directory to be inspected.

In some implementations, index 150 and code storage index 132 may be stored in memory 114, for example in main memory or in disk memory. In some implementations the temporary index 150, the code storage index 132, and the code storage system 134 may be stored in a memory device external to computing device 100. Code storage index 132 and temporary index 150 need not be stored in the same memory device or the same computing device. Accordingly, in some implementations the code storage system 134 and code storage index 132 may be accessible to system 100 via a network, such as network 160.

Computing device 100 may be in communication with the computing devices 190 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the computing device 100 may communicate with and transmit data from computing devices 190. In some implementations computing devices 190 may be incorporated into and part of computing device 100, making network 160 unnecessary.

The non-compliant source code detection system of FIG. 1 operates using a code storage system 134, for example a source code version control system that protects sensitive and valuable source code by restricting access to and controlling changes to source code files. But disclosed implementations can also be used with a less secure document corpus, for example a library of a private enterprise. Such a library may store, for example, DNA sequences or internal documents. Code storage system 134 may include any collection of files and may operate in any context where text comparisons fail to locate matching subsets of text. While this problem is especially acute in source code, due to variable name and function name changes, the same principles may apply to other types of document content.

Figure 2:
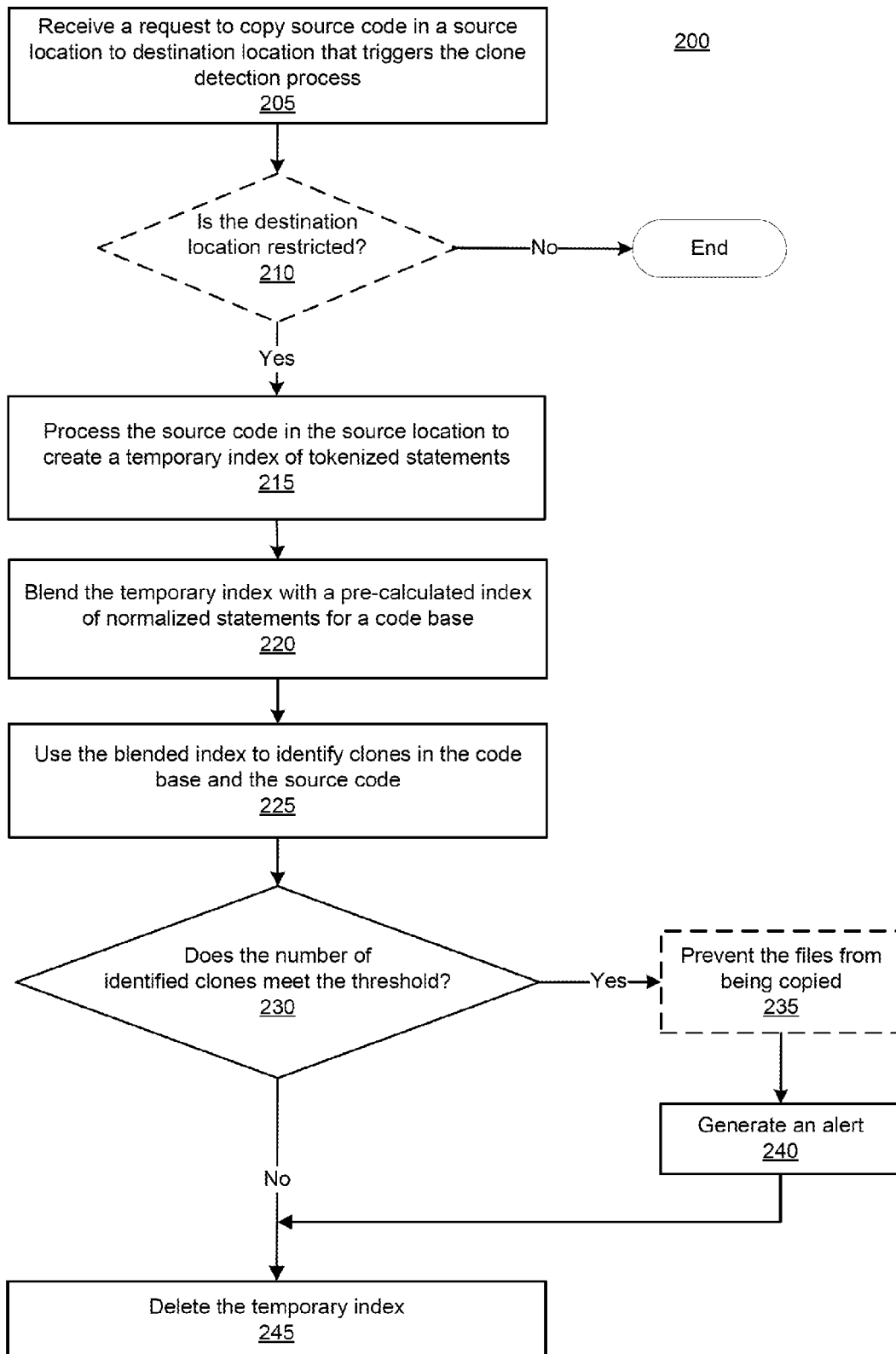
FIG. 2 is a flow diagram illustrating a process for preventing the copying of code clones to an unauthorized destination, consistent with disclosed implementations.

FIG. 2 is a flow diagram illustrating a process 200 for identifying and preventing non-compliant use of source code snippets, in accordance with some implementations. Process 200 shown in FIG. 2 may be performed by a clone detector, such as clone detector 124 shown in FIG. 1, which may use a tokenizer, such as tokenizer 126 shown in FIG. 1, or some other method of clone detection. In some implementations tokenizer 126 may also be used by a module (not shown in FIG. 1) that creates code storage index 132. Process 200 may begin by, for example, a request to copy source code in source location to a destination location that triggers the clone detection process (step 205). For example, a request to copy one or more files from a home directory on or with access to computing device 100, such as a data center) to a directory at another data center may trigger the clone detection process. In another example, a request to copy one or more files from a home directory to a directory used to store e-mail attachments, such as a temporary directory, as part of an operation that attaches files to an e-mail message may trigger the clone detection process. In another example, a request to copy one or more files from a sandbox directory to a directory on a portable storage device may trigger the clone detection process. A sandbox directory may be a software development environment that is separated from the production environment and may generally be considered a directory where a software developer regularly stores software code for software development. Other examples of source locations, destination locations, and copy requests may be within the scope of disclosed implementations.

The clone detector 124 may optionally determine whether the destination location is restricted (step 210). A restricted location may be determined by organizational policy. For example, an organization may have a policy that remote data centers in specific geographical locations are restricted and that no portion of protected source code files may be copied to such data centers. An organization may also decide that no portion of protected source code can be copied to portable devices, such as laptops, or to removable storage media, such as memory sticks and flash drives, and deem such destinations restricted. Organizations may also decide that source code snippets cannot be attached to e-mail messages. In other implementations, an organization may determine that source code in a version control system may not be inserted into a file that is located in an unauthorized location or that is not appropriately protected. For example, a restricted or unauthorized destination may be a location that is unsecure, such as a directory available to the public or simply not designated as secure. If the destination location is not restricted (step 210, No), process 200 may end without further processing or further affecting the copy request. It will be apparent that in some implementations, clone detector 124 may perform step 210 after creating the temporary index, after determining whether the number of clones meets the threshold, or in some other order.

Figure 3:
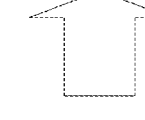
FIG. 3 is an example of a temporary clone detection structure, consistent with disclosed implementations.

If the destination location is restricted (step 210, Yes) then the clone detector 124 may determine whether the source location contains snippets of protected source code. In some implementations, the clone detector 124 may use tokenizer 126 to process one or more source code files in the source location to create a temporary clone detection structure, such as an index of tokenized statements, from the one or more source code files (step 215). Source code files include a series of statements that conform to syntax rules specific to the language they are written in. For example, statements may contain operators, keywords, which are specific to the language, variable names, and comments. Normalizing the statements generally keeps the operators and keywords, discards the comments, and replaces the variable names with a placeholder. For example, the source location may contain source code file X.cpp, shown as file 300 in FIG. 3. X.cpp is an example of a source code file containing comments, operators, keywords, variables, and function calls. To create the temporary index, tokenizer 126 may process source file 300 to create normalized file 325, which shows the statements of file 300 after tokenizer 126 has normalized the statements. Tokenizer 126 may then take n normalized statements and create a hash from the normalized statements. The value of n may represent the length of the smallest code clone, and may be determined by a system operator or system parameters. In the example shown in FIG. 3, n=5, so that the first five statements, taken together, create a hash value 355 starting with 4F7B, as shown in the first entry of temporary index 350. Thus, in the example shown in FIG. 3, tokenizer 126 may process file X.cpp in the source location and create temporary index 350 for X.cpp. Temporary index 350 may contain the file identifier 351, the position 353 of the statement within the file, and the hash of the n normalized statements 355. The position 353 may represent the line number of the statement in the normalized file, with the first line receiving a zero because of zero based indexing. The temporary index of FIG. 3 is one example of a temporary index that clone detector 124 may use, although implementations may use other index file formats.

Clone detector 124 may repeat the process of creating a temporary index for each file located in the source location, or only for designated files in the source location. In some implementations, a user may designate the files when the user attempts to, for example, copy the files or attach the files to an e-mail message. In some implementations a user may designate a location where files are stored and clone detector 124 may process all files at the location. As part of creating index 150, clone detector 124 may create one temporary index for each file processed, or clone detector 124 may create one temporary index that contains the index entries for the processed files. As discussed above, the temporary indexes may be stored in files or in an in-memory table. When clone detector 124 has created the temporary indexe(s), clone detector 124 may blend the temporary index file (or multiple files, if more than one was created) with a pre-calculated index of normalized statements for files in a code base (step 220). In some implementations, the pre-calculated index may have the same format as the temporary index, so that blending involves simply appending the files one to another. Blending may also include merging the files, which may include changing the file format of the temporary index, the pre-calculated index, or both. In some implementations, the two files may be logically blended so that instead of creating a single blended file, tokenizer 126 identifies the temporary index and the pre-calculated index as input to the clone detection process. In some implementations, tokenizer 126 may create and maintain the pre-calculated index as part of adding to and updating a code base, such as code storage system 134 of FIG. 1. In some implementations, the pre-calculated index may be created at regular, scheduled, intervals. Thus, the pre-calculated index, such as index 132 in FIG. 1, may exist prior to the time when the request to copy files (e.g., step 205) was received. Such an implementation may be especially appropriate when the code base is large, because parsing time for a large code base may significantly impact the response time of the copy request if the index 132 is built at the time of the copy request. However, implementations can include a code storage index 132 created at the time of the clone detection request.

Clone detector 124 may then use the blended index, such as index 132 and temporary file 150 of FIG. 1, to identify code clones between the files in the source location and the files in the code base (step 225). For example, in one implementation clone detector 124 may attempt to match the hash values in the temporary index to hash values in the pre-calculated index. If a matching hash value or a sequence of hash values is found, clone detector 124 may determine that a code clone has been found between the two files. The length of the code clone may be determined by the number of consecutive hash values that match. For example, if clone detector 124 determines that the first three entries in the temporary index 350 match three entries in the pre-calculated index, then the code clone has a length of seven because, in the example of FIG. 3, n=5 and each consecutive matching hash value adds an additional statement. Thus, using the example of FIG. 3, the first matching hash entry represents a clone length of five and each of the two consecutive additional matching hash entries add one more to the clone length. Although described above in steps 215 to 225 as using a blended index of tokenized statements, clone detector 124 may use other methods and other clone detection structures for identifying clones in place of steps 215 to 225, such as using a suffix tree or a syntax tree to locate the clones. Thus, disclosed implementations are not limited to the use of hashes of tokenized statements to detect clones between the protected source code and the source location.

As part of the clone identification, clone detector 124 may track the number of clones in, and the length of each code clone found for, each file in the temporary index. When clone detector 124 has finished identifying the clones, clone detector 124 may determine whether the number of identified clones meets a threshold (step 230). Disclosed implementations include various methods of determining whether the threshold is met. In some implementations, clone detector 124 may determine whether a code clone of at least a pre-specified length has been found in a file. If a file contains a code clone of at least the pre-specified length, then clone detector 124 may determine that the number of identified clones meets the threshold (step 230, Yes). In some implementations the clone detector 124 may determine whether the number of clones found in a file meets the threshold, irrespective of the length of the clones. In some implementations clone detector 124 may determine a weighted score for the clones found in the file. For example, clones of smaller length may be weighted less than clones of longer length, and the weighted score may be compared to the threshold. In some implementations, clones may be weighted based on length, position within the file, and/or some other attribute. In some implementations, the clone detector 124 may determine the number of clones found in each file included in temporary index 150 and determine an average number of clones for the source location and use the average number of clones to determine whether the number of clones meets the threshold. In such implementations, the average may be weighted, for example, using the length of the clone or the position of the clone within the file, etc. In some implementations, the clone detector 124 may determine a percentage of each file that contains code clones. For example, if clone detector 124 determines that file 300 of FIG. 3 has a code clone with a length of 7, clone detector 124 may determine that 87.5% of file X.cpp is a clone (because 7 of the 8 lines in the normalized file are considered clones). In such an implementation clone detector 124 may compare the percentage with a threshold (e.g., 50% or 25%) to determine if the number of clones meets the threshold. In some implementations, the percentage may be calculated for the source location, for example, based on the total number of normalized statements in the location and the total length of the clones identified, instead of each individual file. In some implementations an average percentage may be calculated for the source location based on percentages calculated for each file. In some implementations the files in the code base may supply the number compared to the threshold. For example, the percentage of a file in the code base found to have 50% of its lines cloned may satisfy the threshold. In other implementations the files from the source location may provide the number compared to the threshold.

In some implementations the clone detector 124 may employ machine learning to determine if the clones meet the threshold. For example, during a training phase the clone detector 124 may be given several inputs and asked to determine which of the inputs contain clones that satisfy the threshold. During the training, a user may indicate whether the clone detector 124 arrived at the correct conclusion, and based on this feedback clone detector 124 may develop information it uses to properly make the determination. Once the clone detector 124 has been trained, it may use the information to determine whether the identified clones meet the threshold. In some implementations, a combination of these methods may be used to determine whether the threshold has been met.

If the threshold is met (step 230, Yes) then clone detector 124 may optionally prevent the files in the source location from being copied (step 235). For example, clone detector 124 may set a return code that tells the copy process to abort. In some implementations clone detector 124 may prevent individual files from being copied and in some implementations clone detector 124 may prevent any files in the source location from being copied. Clone detector 124 may also generate an alert (step 240) that indicates that one or more of the files could not be copied due to a non-compliant copy request.

In some implementations steps 210 and 235 may be omitted, so that when the threshold is met clone detector 124 does not check the destination location but does generate an alert. In such an implementation the alert may indicate that files containing protected source code have been copied. Clone detector 124 may send the alert to a system administrator or to the user that initiated the copy request, may store the alert in a database for future reporting, etc. Once an alert has been generated, either indicating that the files could not be copied or that the files copied contained code clones, clone detector 124 may delete the temporary index (step 245) and process 200 ends.

Figure 4:
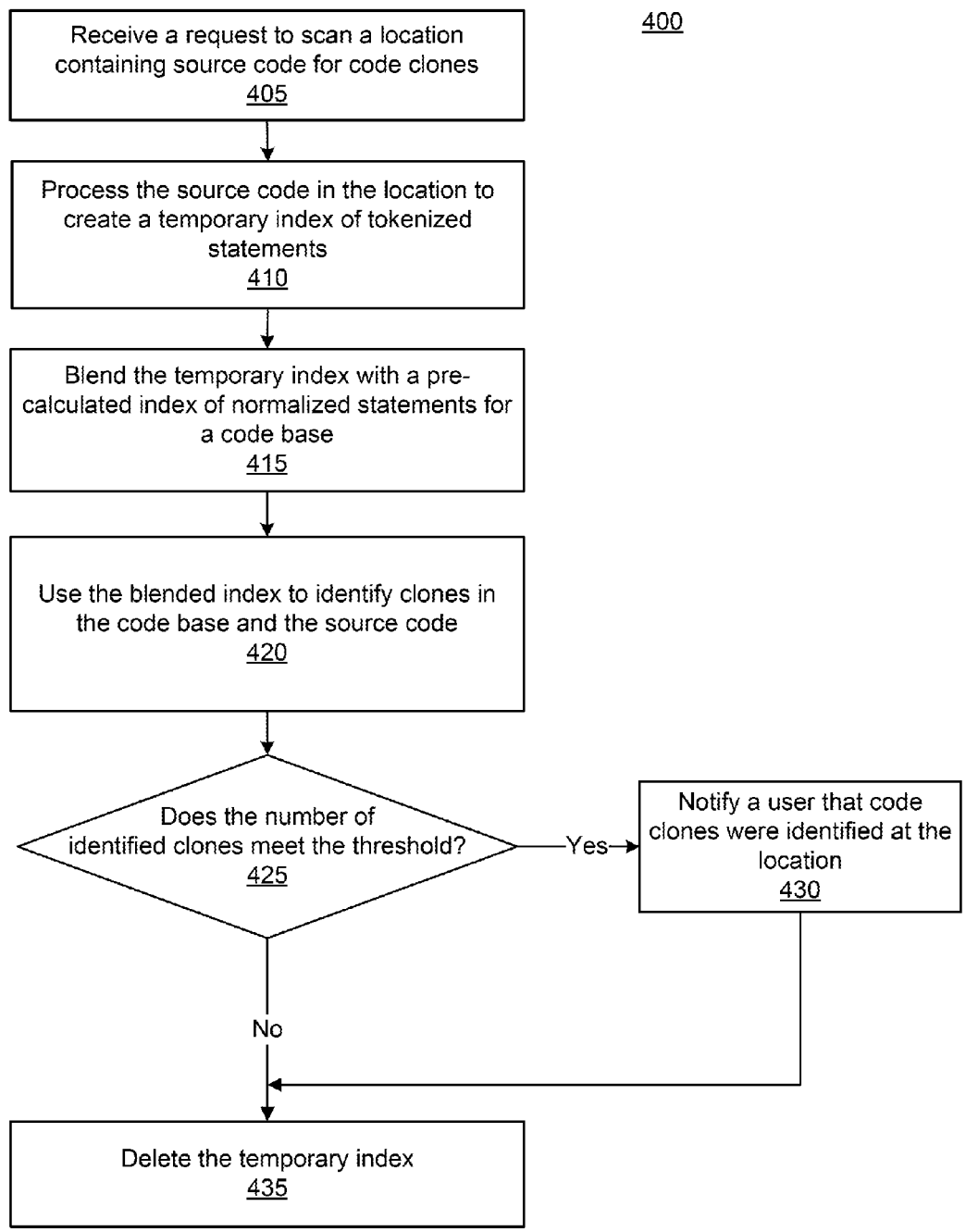
FIG. 4 is a flow diagram illustrating a process for identifying non-compliant instances of source code snippets, in accordance with disclosed implementations.

FIG. 4 is a flow diagram illustrating a process 400 for identifying non-compliant instances of source code snippets, in accordance with disclosed implementations. Process 400 shown in FIG. 4 may be performed by a clone detector, such as clone detector 122 shown in FIG. 1, using a tokenizer, such as tokenizer 126 shown in FIG. 1. Process 400 may begin with the clone detection process being triggered by a request to scan a location containing source code (step 405). For example, a request to scan a mobile device, such as a laptop, netbook, or smart phone, that is connected to computing device 100 may trigger clone detection process 400. In some implementations the scan may be requested when the device requests access to a resource to a network, such as an intranet or internal network of a corporation. In some implementations the scan may be requested when the device requests access to the code storage system or to a computing device with access to the code storage system. In some implementations, a system administrator may explicitly request a scan of the location, e.g., the mobile device, to trigger the clone detection process 400.

The request may include a location on the device to scan or the request may scan any directory on the mobile device. In some implementations, the location may be the location of an e-mail attachment and the request may be initiated when the e-mail is sent. In some implementations the location may be a particular directory, either on computing device 100 or another computing device in communication with computing device 100, and the request may be initiated when a user requests that source code be added to the code storage system from the particular directory. In some implementations, the location may be the location of a removable storage device that becomes visible to computing device 190 when computing device 190 is connected to a corporate network. For example, the code clone detection process may be triggered when a USB memory stick is inserted into a computing device 190 while computing device 190 is connected to a corporate network or while computing device has access to code storage system 134.

The clone detector 124 may use tokenizer 126 to process one or more source code files in the location to create a temporary index of tokenized statements from the one or more source code files (step 410), as described above with regard to step 215 of FIG. 2. Clone detector 124 may process each file located in the location, or only designated files in the location. In some implementations, a user may designate the files when the user attempts to, for example, add the files to the code repository or attach the files to an e-mail message. When clone detector 124 has created the temporary index(es), clone detector 124 may blend the temporary index(es) with a pre-calculated index of normalized statements for files in a code base (step 415), as described above with regard to step 220 of FIG. 2, and may use the blended index to identify clones between files in the source location and files in the code base (step 420), as described above with regard to step 225 of FIG. 2. Although steps 410 to 420 use a blended index of tokenized statements, clone detector 124 may use other methods for identifying clones in place of steps 410 to 420, as described above with regard to FIG. 2.

When clone detector 124 has finished identifying the clones, clone detector 124 may determine whether the number of identified clones meets a threshold (step 425). In some implementations, clone detector 124 may determine whether a code clone of at least a pre-specified length has been found in a file. If a file contains a code clone of at least the pre-specified length, then clone detector 124 may determine that the number of identified clones meets the threshold (step 425, Yes). As discussed above, disclosed implementations include various methods of determining whether the threshold is met. In some implementations the threshold may be per-file and in some implementations the threshold may be per-location. Some implementations may use a length of identified code clones, an average length of identified code clones, a weighted clone score, and/or a percentage of the file that contains code clones. Some implementations may use an average number of identified code clones for the location, a weighted average of clones for the location, or an average percentage of files containing clones for the location. In some implementations, a combination of these methods may be used to determine whether the threshold has been met.

If the threshold is not met (step 425 No), clone detector 124 may delete the temporary index (step 435) and process 400 ends. If the threshold is met (step 425, Yes) then clone detector 124 may notify a user that code clones were identified in files at the location (step 430). In such an implementation the alert may indicate that files containing portions of protected source code have been located in the scanned location. Clone detector 124 may send the alert to a system administrator, send the alert to the user that initiated the scan, store the alert in a database for future reporting, etc. Once clone detector generates an alert indicating that files were found in a non-compliant location, clone detector 124 may delete the temporary index (step 435) and process 400 ends.

FIG. 5 shows an example of a generic computer device 500 and a generic mobile computer device 550, which may be used with the techniques described here. Computing device 500 is intended to represent various forms of digital computers, e.g., laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, for example, display 516 coupled to high speed interface 508. In some implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, for example, a magnetic or optical disk.

The storage device 506 is capable of providing mass storage for the computing device 500. In one implementation, the storage device 506 may be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, for example, the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, for example, a keyboard, a pointing device, a scanner, or a networking device, for example a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer like laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" and "computer-readable storage device" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
    one or more processors; and
    a memory storing instructions that, when executed by the one or more processors, perform operations comprising:
        receiving a location for a first source code file,
        determining that the received location is a restricted location,
        creating, in response to the determining, a temporary index of normalized statements for the first source code file,
        comparing the temporary index of normalized statements for the first source code file having the restricted location and a pre-calculated index of normalized statements for second source code files stored in a protected code location to identify a number of code clones in the first source code file,
        determining whether the number of identified code clones in the first source code file meets a threshold, and
        generating data used to alert a user that the restricted location contains code clones when it is determined that the number of identified code clones meets the threshold.

2. The system of claim 1, wherein the restricted location includes two or more source code files and the operation of determining whether the number of identified code clones meets the threshold includes:
    for a specific source code file, determining whether a number of code clones for the specific file meets the threshold.

3. The system of claim 2, the operations further comprising:
    preventing the specific source code file from being copied when it is determined that the number of code clones for the specific file meets the threshold.

4. The system of claim 1, wherein the threshold is based on a length of at least one of the number of code clones.

5. The system of claim 1, wherein the restricted location includes two or more source code files and the operation of determining whether the number of identified code clones meets the threshold includes:
    for each of the two or more source code files, determining a number of code clones for each file;
    calculating an average number of code clones per file; and
    determining whether the average number of code clones meets the threshold.

6. The system of claim 1, wherein the restricted location is an attachment location for an e-mail message, and the first source code file is the attachment.

7. The system of claim 6, the operations further comprising:
    preventing the first source code file from being sent with the e-mail message when it is determined that the number of identified code clones meets the threshold.

8. The system of claim 1, wherein the restricted location is a source location in a request to copy files from the source location to a destination location.

9. The system of claim 8, the operations further comprising:
    preventing the copying of at least one of the source code files when it is determined that the number of identified code clones meets the threshold.

10. The system of claim 1, wherein the restricted location is a destination location in a request to copy files from a source location to the destination location and the operations further comprise:
    preventing the copying of the first source code file to the destination location when it is determined that the number of identified code clones meets the threshold.

11. The system of claim 10, wherein the destination location is a directory associated with a remote data center.

12. The system of claim 10, wherein the destination location is a location for an attachment to be sent via e-mail.

13. The system of claim 1, wherein the restricted location is a directory on a mobile computing device.

14. The system of claim 13, wherein the data used to alert the user indicates that the mobile device contains portions of source code from the protected code location.

15. The system of claim 13, wherein the operation of receiving the location is performed in response to the mobile device connecting to a computing device with access to the protected code location.

16. A computer-readable storage device for detecting non-compliant use of portions of source code, the storage device having recorded and embodied thereon instructions that, when executed by one or more processors of a computer system, cause the computer system to:
- receive a location of one more source code files;
- determine that the location is a restricted location;
- create, in response to the receiving, a temporary index of tokenized statements for each of the one or more source code files;
- compare the temporary index for one or more source code files having the restricted location and a pre-calculated index of tokenized statements from source code files stored in a protected code location to identify a number of code clones in the one or more source code files;
- determine whether the number of identified code clones meets a threshold; and
- generate data used to alert a user that the restricted location contains code clones when it is determined that the number of identified code clones meets the threshold.

17. The storage device of claim 16, wherein as part of determining whether the number of identified code clones meets the threshold, the instructions further cause the computer system to, for a specific source code file having the restricted location:
- determine a percentage of the specific source code file that contains code clones; and
- determine whether the percentage meets the threshold.

18. The storage device of claim 16, wherein the restricted location is a source location from a request to copy the one or more source code files from the source location to the protected code location and the instructions further cause the computer system to:
- prevent the one or more source code files from being added to the protected code location when it is determined that the number of identified code clones meets the threshold.

19. The storage device of claim 16, wherein the location is the location of a destination directory in a request to copy files from a source directory to the destination directory.

20. The storage device of claim 19, wherein the instructions further cause the computer system to:
- prevent the copying of one or more portions of the at least one of the source code files when it is determined that the number of identified code clones meets the threshold.

21. The storage device of claim 16, wherein the restricted location is an attachment to an email and the instructions further cause the computer system to:
- prevent the sending of the one or more source code files as the attachment to the email.

22. The storage device of claim 16, wherein a code clone includes a sequence of normalized statements from the temporary index that match a sequence of normalized statements from the pre-calculated index.

23. A computer-implemented method comprising:
- receiving, by one or more processors, a request to copy portions of one or more source code files from a source location to a destination location;
- identifying a number of code clones between the one or more source code files and source code from a protected code location;
- determining whether the number of identified code clones meets a threshold;
- determining whether the destination location is authorized to contain source code from the protected code location; and
- preventing one or more portions of the source code files from being copied from the source location to the destination location when it is determined that the number of identified clones meets the threshold and that the destination location is not authorized to contain source code from the protected code location.

24. The method of claim 23, wherein the source location is associated with a first data center and the destination location is associated with a second data center.

25. The method of claim 24, wherein determining whether the destination location is authorized is based on a geographical location of the second data center.

26. The method of claim 23, wherein the destination location is associated with a portable, removable, storage device.

* * * * *